Oct. 31, 1967 R. CARMICHAEL ETAL 3,349,543
GALVANIC CELL CLOSURE
Original Filed Dec. 19, 1961

INVENTORS
ROBERT CARMICHAEL
JAMES SOUTHWORTH, JR.
BY Henry A. Marzullo Jr.
ATTORNEY United States Patent Office 3,349,543
Patented Oct. 31, 1967

3,349,543
GALVANIC CELL CLOSURE
Robert Carmichael, Lakewood, and James Southworth, Jr., Rocky River, Ohio, assignors to Union Carbide Corporation, a corporation of New York
Original application Dec. 19, 1961, Ser. No. 160,620, now Patent No. 3,223,559, dated Dec. 14, 1965. Divided and this application July 3, 1964, Ser. No. 380,151
3 Claims. (Cl. 53—366)

This application is a division of copending application Ser. No. 160,620 which has issued as Patent No. 3,223,559.

This invention relates to a seal closure for a cylindrical galvanic cell container having at least one open end and more particularly to an apparatus for applying such a seal closure. The seal closure is particularly suitable for sealing a galvanic cell container of the type employing an alkaline electrolyte.

A novel method for sealing an alkaline galvanic cylindrical cell container is disclosed in United States Patent No. 3,069,489. The galvanic cell closure disclosed in this patent is achieved by radially compressing under a high external radial force an L shaped hard plastic gasket which is interposed between a container and a cover therefor. When this radial force is applied, the container is reduced in diameter and the gasket is compressed radially against the outside diameter of the cover thus forming a leak-proof seal by virtue of a high residual radial force which is exerted outwardly by the gasket against the container. By utilizing a hard plastic gasket having a very low cold flow, the residual outward radial force is inherently the end result of the external radial force which is applied, and it is this residual force which acts radially to the axis of the container and which provides an effective seal closure.

A nylon, consisting of a hexamethylene diammonium adipate polymer such as that commercially available under the trademark "Zytel" is the preferred material for use as the seal gasket.

The actual method for obtaining a radial seal is disclosed to consist of positioning the gasket and cover on a step of a shouldered cell container or by placing such elements on top of the contents of a straight-sided cell container, and subsequently pushing or forcing the cell container with the gasket and cover in place through a die, thereby drawing down the cell container around the gasket and cover. This operation must be skillfully done, otherwise an undesirable vertical or axial component of force may be produced in the seal closure. Furthermore, if non-uniform loads are used on the cell in forcing the container through the die, this can be detrimental to the quality of the cell since it is possible that these forces could cause the bottom radius of a thin walled cell container to be pushed into a rather sharp corner, thereby causing a dimensional change of the cell which could affect the quality and operational ability of the cell. Moreover, any excessive pressures can damage the contents of the cell, and there is even the possibility that the bottom of the container could be ruptured. If a misalignment occurs by any force in such a method it would jeopardize the radial seal effectiveness.

It is therefore the principal object of this invention to provide an improved apparatus for applying a radial seal closure to a cylindrical galvanic cell container.

Another object of the invention is to provide such a radial seal closure without impairing the quality of the cell or its contents.

Broadly stated, the objects of the invention are accomplished by aligning a cupped galvanic cell container fitted with a gasket and cover in a novel apparatus so that when the apparatus is actuated, a spring with a predetermined rate exerts a uniform pressure on the gasket and cover in order to restrain them from displacement in the vertical direction during the period when a high external radial force is applied to the container thereby deforming it and producing the radial seal.

In order that the invention can be more readily understood, the apparatus for effecting the closure is shown in the accompanying drawing, wherein.

Figure 1:
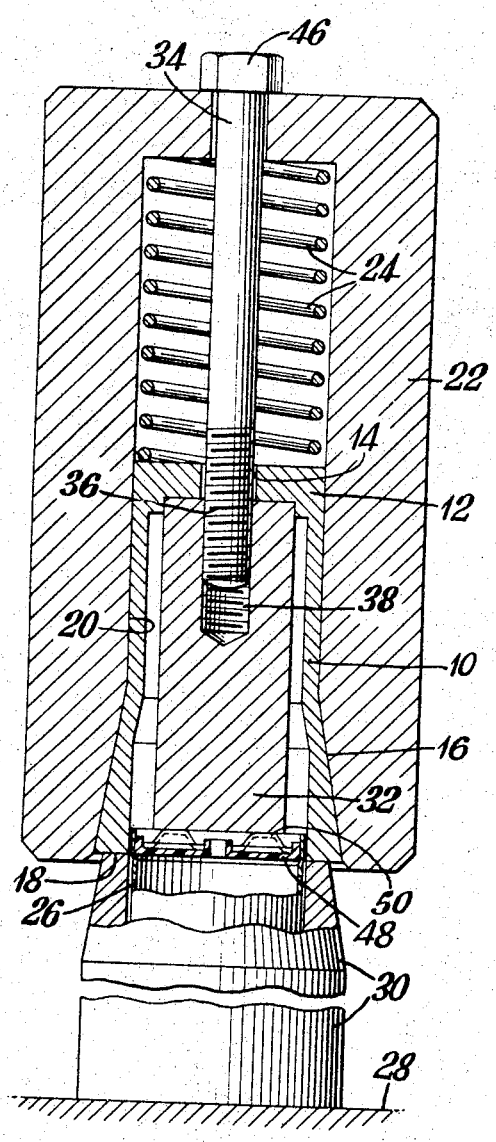
FIG. 1 is a partially sectioned elevational view of the apparatus of the invention with a galvanic cell container in position prior to radial sealing.
Figure 3:
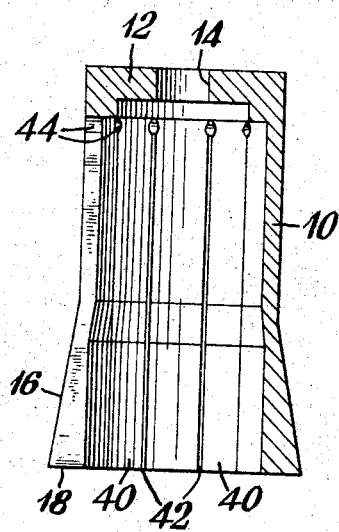
FIG. 3 is a sectional view taken along plane 3—3 of FIG. 2.

Referring now to the drawing and particularly to FIGS. 1 and 3, the apparatus comprises an annular collet 10 having a closed end 12 save for an aperture 14 in its center. The lower portion of the collet 10 has a tapered surface 16 which tapers outwardly from about the center of the collet 10 to a maximum diameter at a segmental face end 18. The collet 10 is positioned within a compatibly shaped recess 20 provided in a collet cam ring 22. Between the end of the collet 10 and the top of the recess 20 a spring 24 is located.

As shown in FIG. 1, a cupped galvanic cell container 26 which is to be radially sealed is positioned directly beneath the collet 10 manually, semi-automatically or by automatic means. The cell container 26 is supported by a platen 28. A collet support ring 30 is used as an aid in positioning and aligning the galvanic cell container 26 during the radial sealing; it also serves as a stop for the segmental face end 18 of the collet 10 to slide on when radial pressure is applied by the collet cam ring 22. A pressure pad 32 is located within the collet 10 and is held in place by a travel screw 34. The travel screw 34 has threads 36 at one end which are threaded into a corresponding tapped hole 38 in the pressure pad 32.

Figure 2:
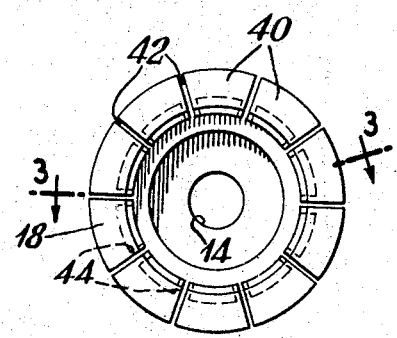
FIG. 2 is an end view of the collet of the apparatus of FIG. 1.

Referring now in particular to FIGS. 2 and 3, it will be seen that the collet 10 is divided into a plurality of partially collapsible segments 40 which are formed by slots 42. Apertures 44 are provided at the end of the slots 42 to aid this inward deflection of the segments 40. The entire circumference of the cell container 26 is supported by the segment 40.

In the operation of providing a radial seal to a galvanic cell container 26, it is necessary to initially set up the apparatus for the particular galvanic cell container 26 to be radially sealed. The travel screw 34 is used to adjust the relative position of the collet 10 with respect to the collet cam ring 22. With the spring 24 exerting a force against the collet 10 and the pressure pad 32, an hexagonal head 46 of the travel screw 34 is rotated to either advance the collet 10 further into the compatibly shaped recess 20 of the collet cam ring 22, or to release the spring force on the collet 10 and the pressure pad 32 thereby withdrawing the collet 10 from the compatibly aligned recess 20 of the collet cam ring 22. When the travel screw 34 is set up for a particular run it acts as a guide and as a limit stop for the collet cam ring 22. After the initial set-up is completed, the galvanic cell container 26 together with a gasket 48 and cover 50 is aligned beneath the apparatus. The cell container 26 may be either a straight-sided one or a shouldered container as depicted in FIG. 1. Also the hard plastic gasket 48 is generally L shaped but it can be other than L shaped to suit the sealing of differently shaped cell containers. When a punch press slide (not shown) carrying the upper assembly of the apparatus travels downward the segmental face end 18 of the collet 10 rests on the face of the collet support ring 30; the collet cam ring 22 continues its downward motion and causes the collet segments 40 to move in radially and reduce the diameter of the container 26 thereby radially squeezing the gasket 48 between the rigid cell cover 50 and container 26. During this action the spring 24 is compressed and applies a pressure on the pad 32 which in turn holds the cover 50 and gasket 48 in proper alignment with the container 26. When the press releases its forces on the upward stroke the collet is returned to its normal position by the action of the spring 24 and travel screw 34. It is to be appreciated that the spring restrains the gasket and cover from any vertical displacement and eliminates the build up of vertical or axial components of forces in the closure while the radial seal is applied. This basic method of making a radial squeeze closure can also be produced by the action of a double slide press thus eliminating the need for a collet support ring 30. In one cycle of such a press the inner slide would actuate and control the vertical movement of the collet 10 and pressure pad 32 assembly so that in a downward dwell position it holds the cover and gasket in place in the container 26, whereupon the second or outer slide would move down with the cam ring 22 attached and cause the collet segments 40 to move in radially and produce the desired radial squeeze seal. The upward stroke of the press would release all pressures, eject the cell container from the apparatus, and free the container for horizontal ejection.

To test the effectiveness of the invention in preventing and eliminating the vertical component of the external radial force, a quarter-inch diameter steel sphere was interposed between an empty galvanic cell container (made from 0.010 inch sheet stock) and the platen of the apparatus; a radial seal was then applied to the cell container. After the radial seal was formed, the container was inspected to determine if any noticeable dents or marks were formed in the bottom of the cell container. No marks or dents were found, thus indicating that any vertical component of the radial force and any other forces built up in a vertical axis direction is either negligible or practically non-existent when a radial seal closure is made by the practice of the subject invention.

What is claimed is:

1. Apparatus for applying a seal to a galvanic cell container comprising collet means having radially flexible segments for applying a sealing force to said container, cam means surrounding said collet means and axially movable relative thereto to actuate said flexible segments, pad means fixedly attached to said collet means and abutting said seal to prevent axial displacement of said seal, actuating means effecting relative axial displacement between said cam means and said collet means, and support means engaging said collet means precluding axial pressure upon said seal and container.

2. Apparatus for applying a seal to a galvanic cell container comprising a cylindrical collet having radially flexible segments for applying a sealing force to said container, a cam ring surrounding said collet and axially movable relative thereto, said cam ring having an inner surface configured to apply a force to radially flex said segments, a pad fixedly mounted to said collet abutting said seal to prevent axial displacement thereof, a support ring fixedly holding said cell container while said sealing force is applied, and means for effecting relative axial displacement between said support ring and said cam ring, said support ring slidably abutting said collet to prevent relative axial displacement therebetween and preclude axial pressure upon said seal and container while permitting radial displacement of said flexible segments with said collet in position to apply said sealing force.

3. Apparatus for forming a seal on a galvanic cell container comprising a cylindrical collet having radially flexible segments for applying a sealing force to said container, a cylindrical cam ring having said collet concentrically positioned therein and axially movable relative thereto with the inner surface of said cam ring slidably engaging the outer surface of said collet to radially displace said flexible segments, adjustable spring means compressively mounted between said collet and said cam ring permitting axial positional adjustment therebetween, a pad fixedly mounted to said collet for holding said seal in position by preventing axial displacement thereof, a stationary support ring fixedly holding said cell container in sealing position, and means for axially driving said cam ring relative to said support ring, said support ring abutting said collet to prevent axial movement thereof but effecting sliding contact at said point of abutment thereby permitting radial displacement of said flexible segments by said cam ring to apply a radial sealing force to said cell container while precluding axial pressure thereon.

References Cited

UNITED STATES PATENTS 808,536   12/1905   Gillette _____ 53—351

FOREIGN PATENTS 960,252   7/1964   Great Britain.

TRAVIS S. McGEHEE, *Primary Examiner.*

FRANK E. BAILEY, *Examiner.*

R. L. FARRIS, *Assistant Examiner.*